(12) United States Patent
Speer

(10) Patent No.: US 6,247,867 B1
(45) Date of Patent: *Jun. 19, 2001

(54) COUPLING MEANS

(75) Inventor: Ian McKenzie Speer, Kalamunda (AU)

(73) Assignee: Norncott Pty Ltd., Bayswater (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/945,161

(22) PCT Filed: Apr. 22, 1996

(86) PCT No.: PCT/AU96/00231

§ 371 Date: Dec. 17, 1997

§ 102(e) Date: Dec. 17, 1997

(87) PCT Pub. No.: WO96/33353

PCT Pub. Date: Oct. 24, 1996

(30) Foreign Application Priority Data

Apr. 21, 1995 (AU) .................................................. PN2550

(51) Int. Cl.[7] .................................................. B60B 27/00
(52) U.S. Cl. .............................. 403/1; 403/33; 403/359.4; 192/69.9; 192/114 R
(58) Field of Search ................................ 464/89, 87, 901; 192/69.9, 69.91, 114 R; 403/1, 27, 33, 359.4, 327

(56) References Cited

U.S. PATENT DOCUMENTS

| | | | |
|---|---|---|---|
| 1,844,016 | * 10/1932 | Lounsbury | 192/69.91 X |
| 3,539,045 | * 11/1970 | Sinclair | 192/69.91 X |
| 3,610,713 | * 10/1971 | Satterthwaite . | |
| 3,872,955 | * 3/1975 | McIntyre | 192/69.91 X |
| 4,131,185 | * 12/1978 | Schall . | |
| 4,281,240 | * 7/1981 | Smilgys . | |
| 4,349,092 | * 9/1982 | Geisthoff | 192/114 R |
| 4,772,245 | * 9/1988 | Readman et al. | 464/89 |
| 4,869,354 | * 9/1989 | Brazier | 192/69.91 X |
| 4,915,200 | * 4/1990 | Jacques et al. | 192/114 R |
| 5,163,824 | * 11/1992 | Kantner . | |

FOREIGN PATENT DOCUMENTS

| | | |
|---|---|---|
| 3822637 | 1/1990 | (DE) . |
| 4446689 | 6/1995 | (DE) . |
| 249989 | 12/1987 | (EP) . |
| 2493447 | 5/1982 | (FR) . |
| 56-83622 | 7/1981 | (JP) . |
| 3-219114 | 9/1991 | (JP) . |
| 1734580 | 5/1992 | (SU) . |

* cited by examiner

Primary Examiner—Lynne H. Browne
Assistant Examiner—John R. Cottingham
(74) Attorney, Agent, or Firm—Merchant & Gould P.C.

(57) ABSTRACT

A coupling for engaging and disengaging a drive means (12) from a driven member (10), the coupling comprising a stress absorbent coupling member (20), a shaft (22), operably connected to a drive (12), and an actuating member (28), the coupling member being slidably mounted on the shaft (22) such that on operation of the actuating member (28), the coupling member is caused to slide along the shaft (22) between a first position at which the drive is disengaged from the driven member and a second position at which the drive engages the drive member.

16 Claims, 6 Drawing Sheets

COUPLING MEANS

FIELD

This invention relates to a coupling for a driven member and more specifically to a driven member incorporating a coupling that allows for the driven member to be conveniently engaged and disengaged from a drive means.

BACKGROUND

The coupling between a drive and its driven member is exposed to considerable pressures and stresses and as a result frequently requires servicing and/or replacement. Indeed, couplings serve as a link between a drive means and a driven member and are frequently formed of materials such as metal and the like which are responsible for the transfer of considerable stresses, including torsional and vibrational stresses, produced between the coupling and the driven member along the drive train thus resulting in the stressing and wear of the coupling and other parts which can be costly and time consuming to repair or replace.

Further, when a drive is semi-permanently coupled to its corresponding driven member, disengaging the coupling (and as such the engine) from its driven member can be a complex and time consuming task requiring the apparatus to be broken down in order to gain access to the coupling to effect the disengagement.

Another problem with coupling arrangements is running contact which results in the wearing of components due to friction. Running contact during the engagement of the drive means with a driven member is clearly undesirable and can greatly affect the working life of the coupling. Present methods for dealing with the problem of running contact are less than adequate.

SUMMARY

The present invention seeks to provide a coupling means which at least assists in overcoming the difficulties discussed above. The coupling means of the present invention is suitable for use in a variety of applications and is especially applicable in situations where a drive means is required to be disengaged and re-engaged intermittently.

The present invention provides a coupling means for engaging and disengaging a drive means from a driven member, the coupling means comprising a drive means associated portion and a driven member associated portion, at least one of the said associated portions being stress absorbent, and at least one of the said associated portions being moveable relative to the other said associated portion between a first position at which the drive means is disengaged from the driven member and a second position at which the drive means engages the driven member.

The present invention also provides a coupling means adapted for the static engagement and disengagement of a drive means from a driven member, the coupling means comprising a drive means associated portion and a driven member associated portion, at least one of said associated portions being stress absorbent, and at least one of said associated portions being moveable relative to the other said associated portion between a first position at which the drive means is disengaged from the driven member and a second position at which the drive means engages the driven member.

The drive means associated portion may be of various forms. In one preferred form, the drive means associated portion is provided by a stress absorbent coupling member.

Preferably, the stress absorbent coupling member is slidably mounted on a shaft forming part of the drive means, such that the coupling member may slide along the shaft to engage and disengage the drive means from the driven member. Alternatively, the stress absorbent coupling member may be fixed on the shaft and the shaft is adapted to be moveable to allow the stress absorbent coupling member to slide in and out of engagement. In yet another alternative, the stress absorbent coupling member may be moved in and out of engagement by moving the entire drive means relative to the driven member.

Preferably, the engagement and disengagement of the drive means from the driven member is achieved by movement of the stress absorbent coupling member relative to either or both of the drive means and driven member. In this respect, the stress absorbent coupling member may be of various forms. In one preferred form, the stress absorbent coupling member is provided by a portion of the driven member. Alternatively, the coupling member may be provided as a portion of the drive means.

It will be appreciated that the stress absorbing capability of the coupling member prevents the transfer of stresses including torsional and vibrational stress to other parts of the drive means and driven member. The stress absorbent coupling member may thus be formed partly or wholly of a variety of materials having stress absorbing qualities. In one particular form, the stress absorbent coupling member is formed at least partially of a rubber material.

Further, the coupling means of the present invention allows for the mechanical isolation of the engageable components. Thus, when the drive means is disengaged from the driven member there is no contact and no wearing of the components.

The driven member associated portion may be of various forms. In one preferred form, the driven member associated portion is provided by a stress absorbent coupling member. Alternatively, the driven member associated portion may be adapted to receive the drive means associated portion in the form of a stress absorbent coupling member.

In the most preferred form of the present invention, the driven member associated portion is a stress absorbent coupling member and the drive means associated portion is adapted to engagedly and releasibly receive the stress absorbent coupling member. Indeed, the following description of the additional preferred features of the present invention will (for ease of reference) refer to this most preferred form. However, it must be appreciated that the following description is not to limit the generality of the above description.

With this in mind the present invention also provides a coupling means adapted for the static engagement and disengagement of a drive means from a driven member, the coupling means comprising a driven member associated portion in the form of a stress absorbent coupling member, a shaft operably connected to the driven member, and an actuating member, the coupling member being slidably mounted on the shaft such that on operation of the actuating member, the coupling member is caused to slide along the shaft between a first position at which the driven member is disengaged from the drive means and a second position at which the driven member engages the drive means.

The shaft may be of various configurations provided it can accommodate the stress absorbent coupling member. In one preferred form, the shaft is splined and the coupling means is mounted on the splined shaft such that on rotation of the shaft the stress absorbent coupling member is also caused to rotate.

The shaft may also incorporate at least one locating means and preferably a first and second locating means. In this preferred form, the locating means are preferably in the form of first and second grooves located around the circumference of the outer surface of the shaft, and the stress absorbent coupling member may incorporate a detent, preferably in the form of a spring and ball bearing arrangement. The detent and locating means allow for the stress absorbent coupling member to be releasably and positively engaged at a first position at which the drive means is disengaged from the driven member and a second position at which the drive means engages the driven member.

The coupling means of the present invention may be provided as a retrofit in which the coupling member is mounted on the shaft of an existing drive means via a sleeve member. Alternatively, the coupling member may be mounted directly on a suitable shaft. In this respect, if the coupling member is to be mounted directly on the shaft of a driven member it may be necessary to replace the original shaft with a shaft that is compatible with the coupling member.

The actuating member is preferably provided by a handle means or the like which may be levered to allow for a small movement of the handle means to cause a relatively large movement of the stress absorbent coupling member. Thus, the actuating member is preferably a levered handle means operably connected to the stress absorbent coupling member such that on movement of the handle the stress absorbent coupling member is caused to slide along the shaft.

Furthermore, the handle means is preferably operably connected to the coupling member via an intermediate member, preferably a yoke, the intermediate member preferably forming a backing to the stress absorbent coupling member. Thus, it will be seen that the actuating member allows for convenient manual engagement and disengagement of the drive means by causing the stress absorbent coupling member to slide along the shaft to engage and disengage the driven member.

The intermediate member may be of various forms and preferably is formed as circular member having a recess at its radial surface. The recess preferably being adapted to receive a contact member such as a pin or the like, the contact between the pin and the recess of the circular member serving to effect the movement of the coupling member on operation of the actuating means.

The operation of the handle causes the contact member to contact the recess of the circular and cause the coupling member to move along the shaft between its first and second positions. Once the coupling member has been located in its first or second position the contact member may be moved to a position in the centre of the recess at which there is no contact with the recess and the circular member may rotate without friction with the contact member.

Thus, the present invention also provides a coupling means comprising a stress absorbent coupling member, a shaft operably connected to a driven member, and an actuating member, the stress absorbent coupling member being slidably mounted on the shaft such that when the coupling member is in the second position there is no running contact between components of the coupling means.

The present invention thus provides a coupling means that allows for a drive means to be conveniently disengaged and engaged from a driven member. It will be appreciated that when disengaged there is no frictional contact between the drive means associated portion and the driven member associated portion. Thus, the present invention provides a coupling means delivering a torsionally elastic drive and allows for mechanical isolation of the engageable components.

BRIEF DESCRIPTION OF THE DRAWINGS

This invention will now be described in relation to two preferred embodiments thereof as illustrated in the accompanying drawings. However, it will be understood that the generality of the above description is by no means limited by the description of the embodiments.

DETAILED DESCRIPTION

Figure 1:
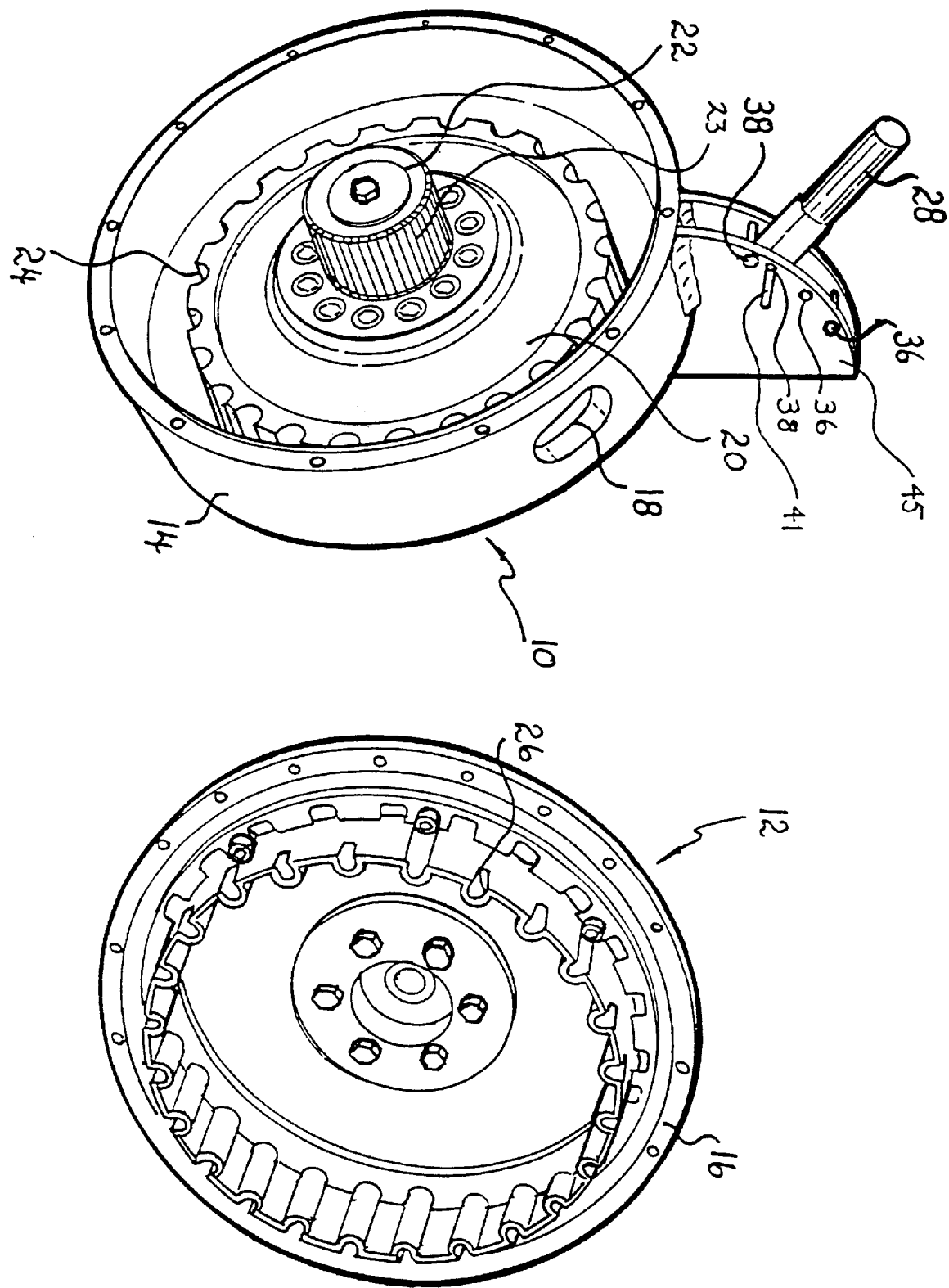
FIG. 1 is a perspective view of a coupling means according to a first preferred embodiment of the present invention including a drive means together with a compatible driven member which forms a portion of a compressor or some other like apparatus.
Figure 2:
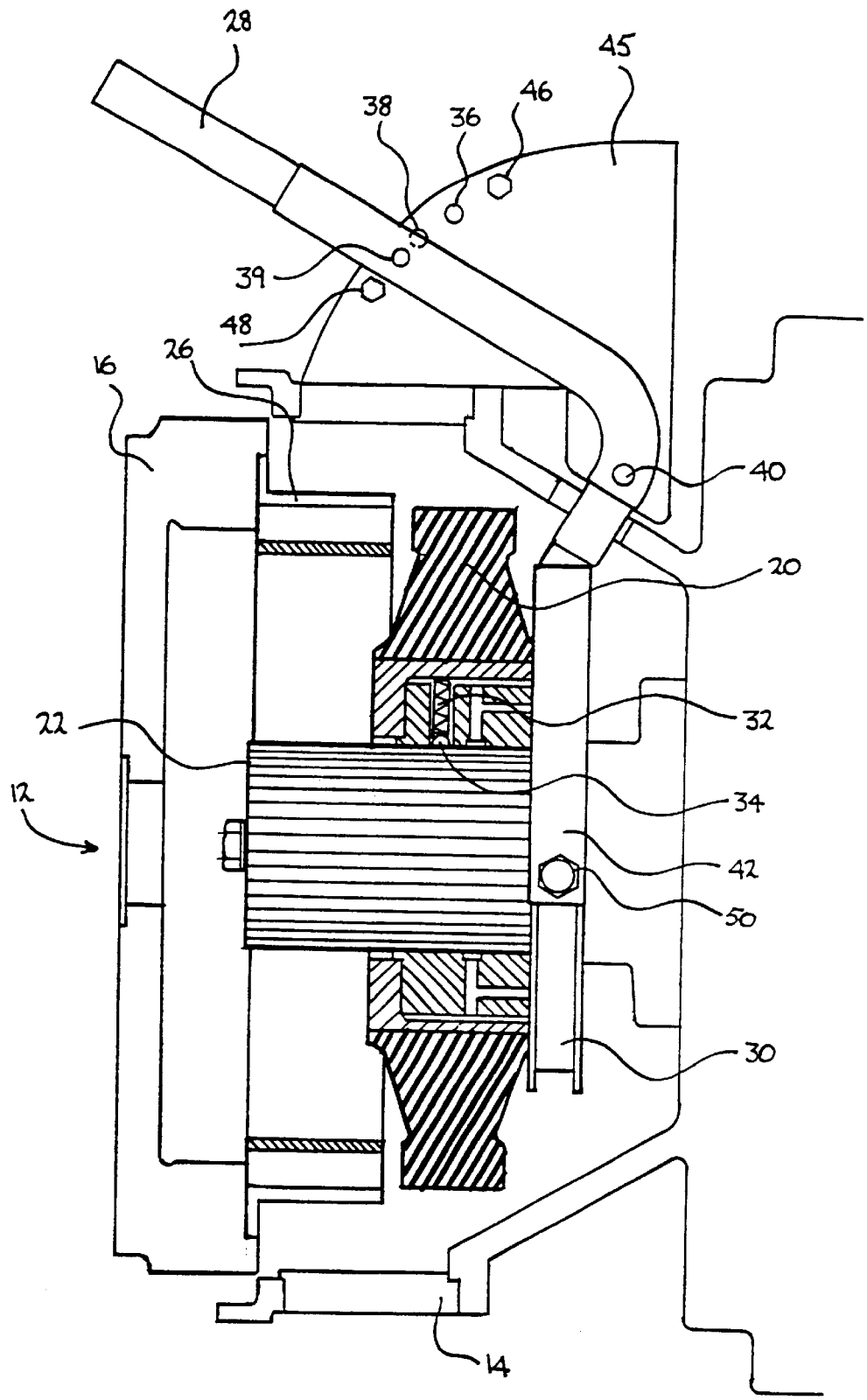
FIG. 2 is a side view in cross section of the coupling means of FIG. 1 shown with the drive means fitted to the driven member and in the disengaged position.
Figure 3:
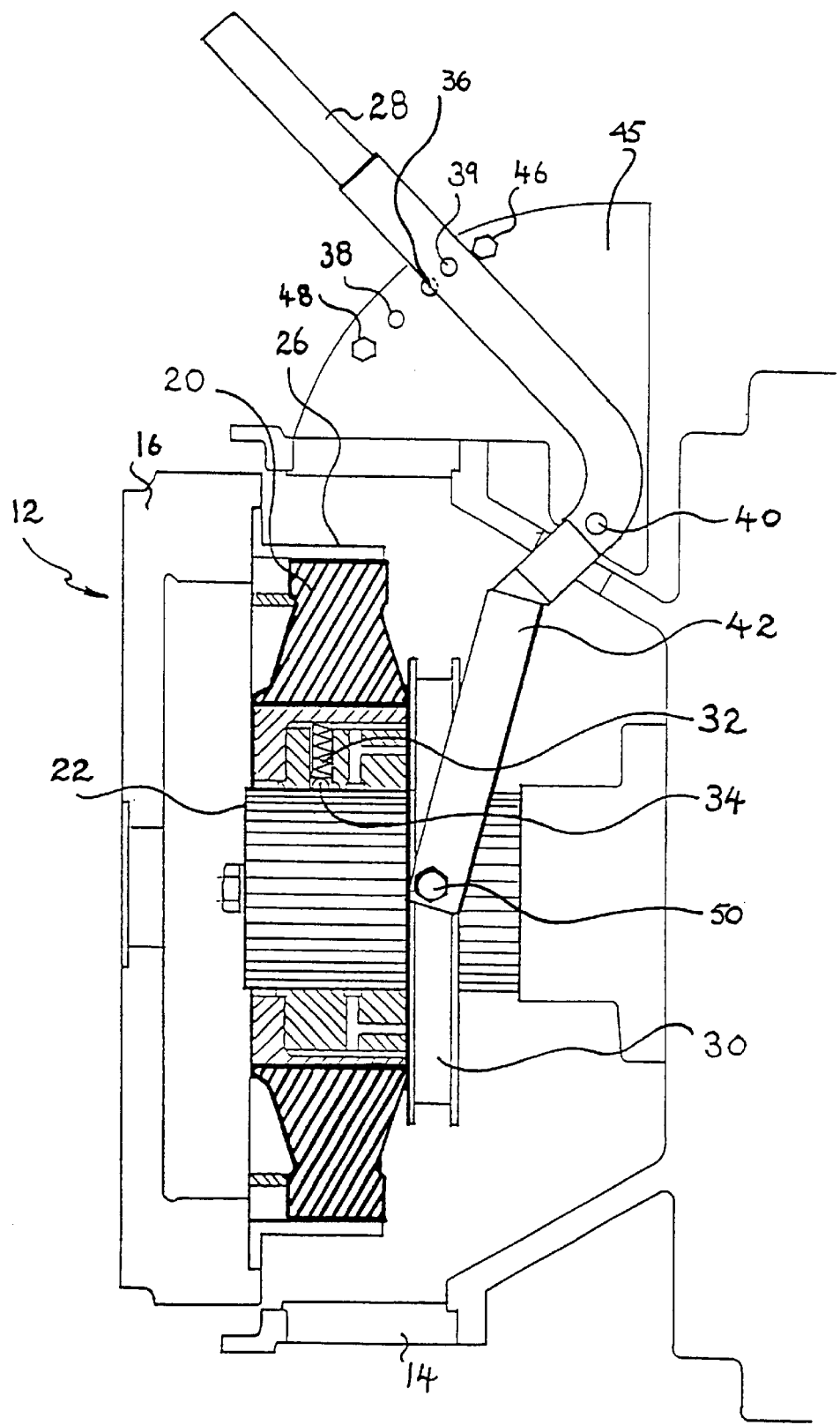
FIG. 3 is the coupling means of FIG. 2 shown with the drive means in the engaged position.

The coupling means of the preferred embodiments are designed for use with a driven member in the form of a compressor or some other similar apparatus. The preferred embodiment of FIG. 1 shows a portion of a drive means generally indicated by the numeral 12, and a portion of a compressor 10. In this respect, it is envisaged that one application of the coupling means of the preferred embodiments will be in relation to compressors used in the mining industry. Compressors of this type are used in drilling procedures and at intermittent times during the drilling procedure air from the compressor is required. The coupling means of the preferred embodiments allow the compressor to be operated intermittently during the drilling procedure.

The portion of the compressor 10 incorporates a shroud 14 which can be bolted to a compatible portion 16 of the drive means 12 to fully enclose all the moving parts to protect both persons external to the apparatus and also to protect the internal components of the apparatus from damage from external factors. The shroud 14 incorporates an inspection port 18 to enable the internal functioning of the apparatus to be assessed by an external user as well as to assist in positioning the stress absorbent coupling member 20 for engagement with the compatible portion 26 which is provided integrally with the engine 12 in this embodiment.

The stress absorbent coupling member 20 is formed of a stress absorbing rubber and is slidably mounted on a shaft 22 via a splined sleeve 23, the stress absorbing coupling member 20 is of a generally circular cross section and has a convoluted radial surface 24 formed so as to be compatible and interlockingly engagable with the compatible portion 26 of the engine 12.

An actuating member in the form of a handle 28 which comprises a lever mounted towards one end from a pivot pin 40 supported from a shroud 45 is provided to operate the coupling means 12. The handle is coupled to the coupling means 12 through a yoke 42 which is engaged with an intermediate member 30 supported from the coupling member 20. The intermediate member has a groove in its radial surface. The yoke 42 comprises a pair of arms which are located to each side of the intermediate member 30 where each arm is associated with a contact member 50 which extends into the groove of the intermediate member. As a result of the presence of the contact member 50 on each arm of the yoke within the groove of the intermediate member, axial movement of the contact members will cause corresponding axial movement of the intermediate member and coupling member. Such axial movement is effective by pivotal movement of the handle 28 about the pivot 40 whereby pivotal movement of the handle 28 results in slidable movement of the coupling member 20 along the splined shaft between a first position at which it is disengaged from compatible portion 26 of the engine and the second position at which the coupling member is engaged with the compatible portion 26 of the engine 12.

A locating means comprising a spring 32 and ball bearing 34 arrangement is provided to releasably locate the coupling member 20 at its respective engaged and disengaged positions. The ball bearing 34 locates in one of two locating grooves (not shown) on the splined shaft 22 and serves to releasably locate the coupling member 20 in its disengaged and engaged positions. The clicking of the ball bearing 34 into the locating groove also serves as an indicator to the operator as to the position of the coupling member 20.

The handle 28 is provided with a shroud 45 which incorporates a positioning means to assist in positively locating the handle 28 when the coupling member is in its engaged and disengaged positions and ensures that there is no running contact between components when the coupling member 20 is engaged. The shroud 45 includes a pair of stops in the form of pins 46, 48 together with a holding means in the form of a pair of bores 36,38 to locate and hold the handle 28 in a position at which there is no contact between the grooved annulus 30 and the shaft of bolt 50. The handle 28 also has a bore such that when the handle is in position for the coupling member to be engaged or disengaged, a pin or bolt 39 may be passed through the handle 28 and one of the locating bores 36, 38 to releasably hold the handle 28 in place.

To engage the coupling member 20, the handle 28 is moved to its extreme position adjacent stop 46 and the coupling member 20 locates in the locating groove (not shown). Once the coupling member is so located the handle 28 is moved so bore 39 in the handle aligns with the bore 36 in the shroud 45 the coupling is engaged. Once secured in this position there is no running contact between the grooved annulus 30 and the shaft of bolt 50 as the shaft is centrally located within the recess of the grooved annulus 30.

Thus, the operator can conveniently engage and disengage the drive means 12 from the compressor 10 as required. By moving the handle 28 about its pivot point 40 the yoke 42 is caused to act on the grooved annulus 30 via the shaft of bolt 50 which results in the coupling member 20 sliding along the shaft 22 between the two locating grooves (not shown).

Figure 4:
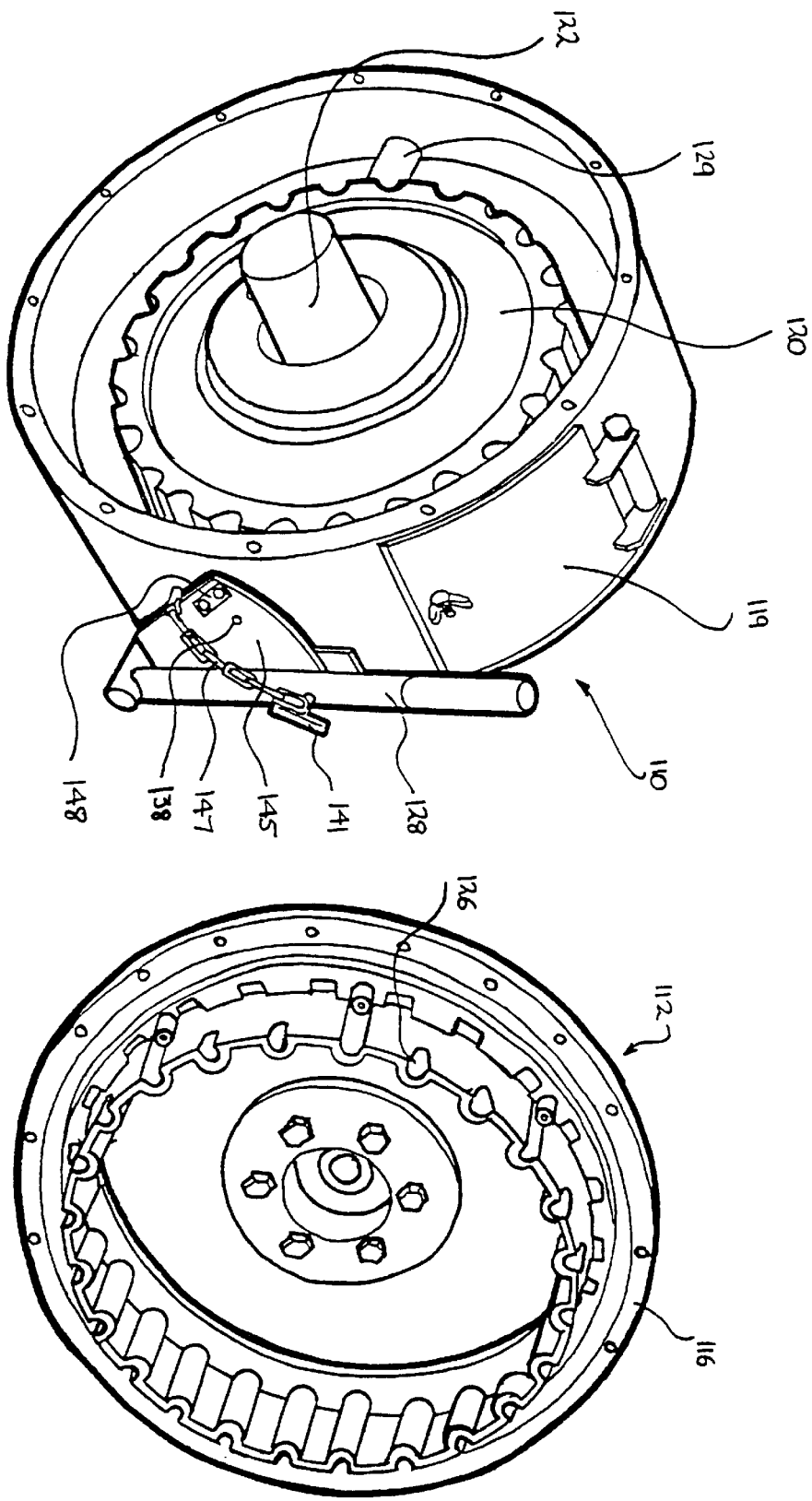
FIG. 4 is a perspective view of a coupling means according to a second preferred embodiment, with an alternative actuating member arrangement.
Figure 5:
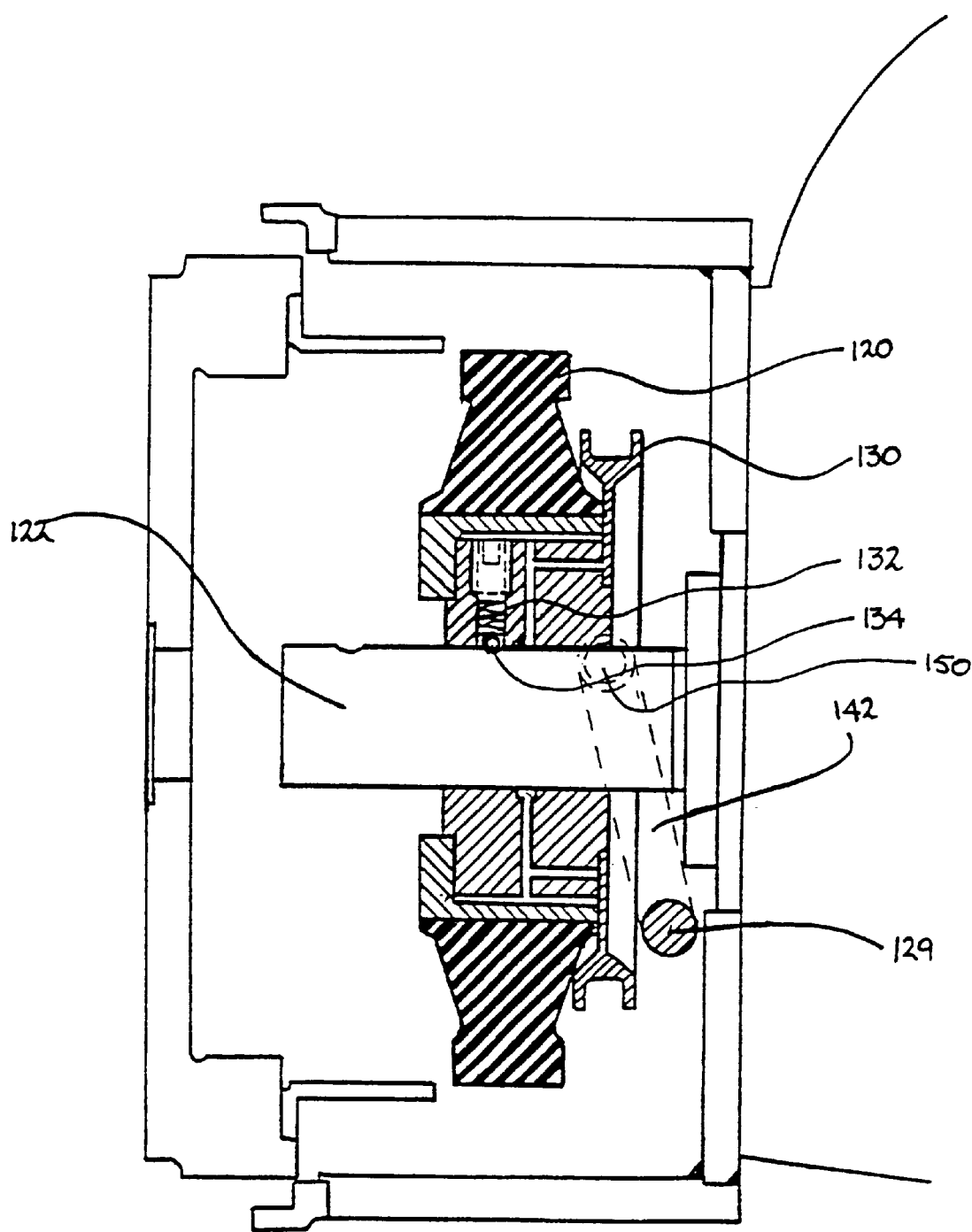
FIG. 5 is a side view in cross section of the coupling means of FIG. 4 with the drive means disengaged from its compatible driven member.
Figure 6:
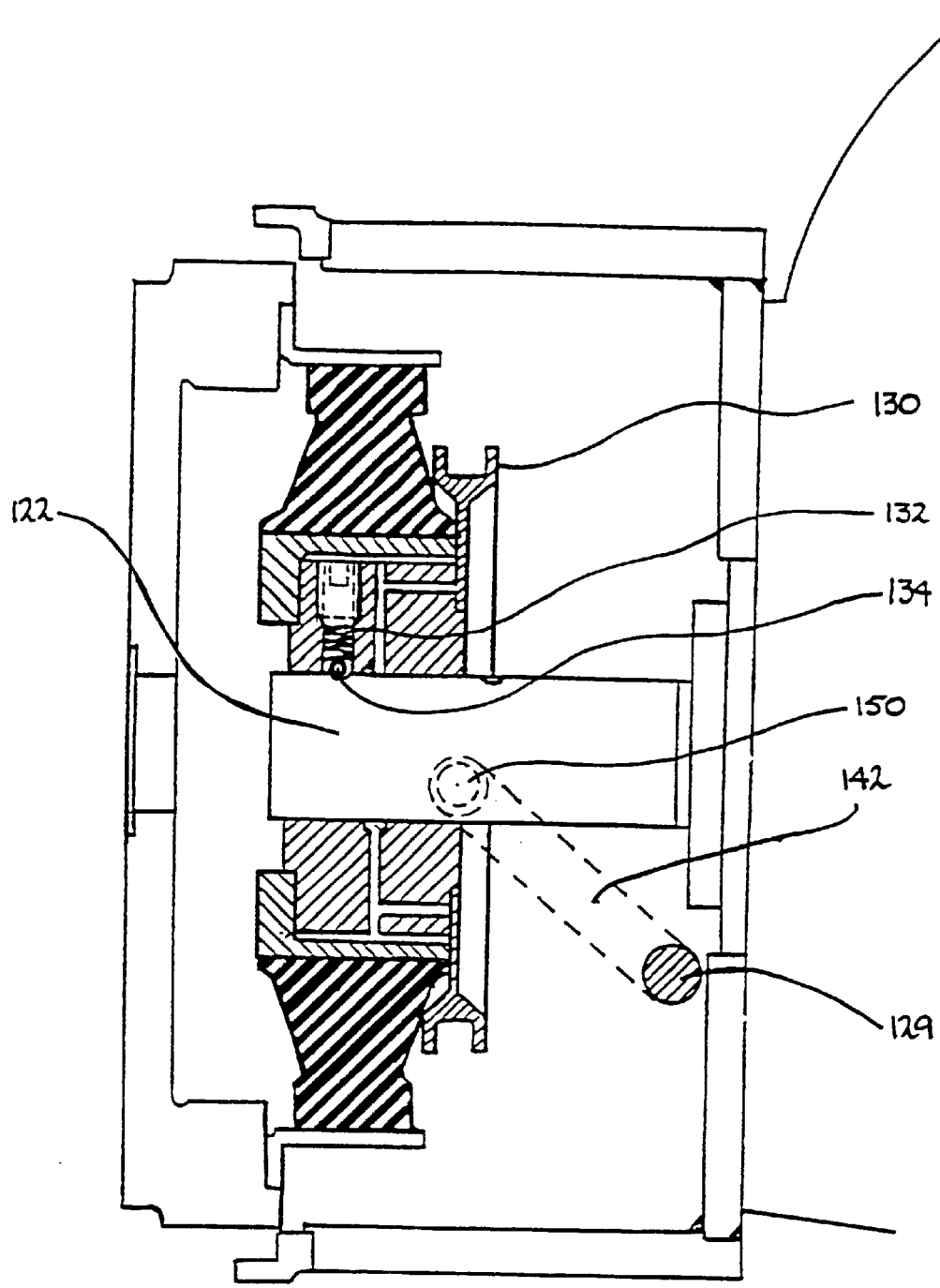
FIG. 6 is a side view in cross section of the coupling means of FIG. 4 with the drive means engaged with its compatible driven member.

The coupling means 112 of the second embodiment shown in FIGS. 4–6 is similar to the first embodiment but includes an alternative actuating means in the form of a side mounted handle 128 and employs a coupling member 120 mounted directly on the shaft 122 rather than employing a sleeve member. In addition it incorporates an inspection hatch 119 which may be opened or closed as desired to view the internal workings of the coupling means. In most other respects the coupling means of the second embodiment corresponds with that of the first embodiment.

The actuating means comprises a handle 128 connected to a crank shaft 129 which extends across the back of the coupling member 120. The crank shaft 129 supports two operator arms 142 which incorporate bolts 150 located at diametrically opposed points at the rear of the coupling member 120, the shaft of the bolts 150 extending into the recess of yoke 130. Thus, on operation of the handle 128, the crank shaft 129 is caused to rotate and the operator arms 142 effect movement of the coupling member 120 along the shaft 122 via contact between the shaft of bolts 150 and the sides of the recess in the radial surface of the yolk 130.

The handle 128 also incorporates a shroud 145 including locating pins 146, (not shown) and locating bores 138, (not shown) to releasably locate the handle 128 in position. As in the first embodiment the handle 128 has a bore to allow for a pin or bolt 141 or the like to pass through the handle 128 and one of the bores 138, (not shown) to releasably hold the handle 128 in position. A chain 147 is attached to the bolt 141 and mounted on the shroud 145 to ensure the bolt 141 is not misplaced when disengaged from the apparatus to effect movement of the handle 128.

The coupling means of the second embodiment operates in a similar fashion to that of the first embodiment. To engage the coupling member 120 the handle 128 is moved to its extreme to abut pin 148. At this position the coupling means 120 is located in the groove 148 via the spring 132 and ball bearing 134. The handle 128 is then moved so that the bore (not shown)in the handle 128 aligns with the bore 138 in the shroud 145 and the handle 128 is secured with pin 141 such that whilst the coupling means is engaged there is no running friction between the yoke 130 and the shaft of bolt 150 which is centrally located within the recess in the radial surface of yoke 130.

It will be realised that there will be modifications in addition to those discussed above. Such modifications being apparent to one skilled in the art. These modifications are to be included within the scope of the present invention.

What is claimed is:

1. A drive assembly comprising:
   a rotating drive member;
   a driven member; and
   a coupling mounted between the rotating drive member and the driven member in a manner to enable the static engagement between the drive member and the driven member to cause rotation of the driven member by the drive member and to enable static disengagement between the drive member and the driven member, the coupling including a first portion associated with one of the members, and a second portion associated with the other member; where the first and second portions are moveable relative to each other between an engaged position at which the first and second portions are engaged with each other, whereby the members are engaged, and a disengaged position at which the first and second portions are disengaged from each other, whereby the members are disengaged, at least one of said two portions being formed at least in part of a resiliently flexible non-metallic material to provide a stress absorbent coupling between the members.

2. A drive assembly according to claim 1 wherein the portion associated with the driven member is moveable relative to the portion associated with the rotating drive member between the engaged position and the disengaged position in its movement.

3. A drive assembly according to claim 1 wherein the portion associated with the rotating drive member is moveable relative to the portion associated with the driven member between the engaged position and the disengaged position in its movement.

4. A drive assembly according to claim 1 wherein the portion associated with the driven member is formed at least in part of the resiliently flexible non-metallic material.

5. A drive assembly according to claim 4, further comprising a shaft operably connected to the driven member, a coupling member and an actuating member, the coupling member being slidably mounted on the shaft, the coupling member and the actuating member being interconnected such that on operation of the actuating member, the coupling member is caused to slide along the shaft between a first position at which the drive and driven members are in the disengaged position and a second position at which the drive and driven members are in the engaged position.

6. A drive assembly according to claim 5 wherein the coupling member is adapted to engage the portion associated with the drive member when in its second position.

7. A drive assembly according to claim 6 wherein the coupling member has a generally circular cross section and has a convoluted outer circumferential surface which is engageable with the portion associated with the drive member when in its second position.

8. A drive assembly according to claim 5 further comprising a locating means for locating the coupling member at the first or second position, the locating means adapted to restrict axial movement of the coupling member along the shaft when the coupling member is not being influenced by the actuating member.

9. A drive assembly according to claim 8 wherein the locating means comprises interengaging portions of the shaft and the coupling member which become interengaged when the coupling member is at its first position and its second position.

10. A drive assembly according to claim 9 wherein the interengaging portions of the shaft comprises a pair of spaced grooves formed in the shaft and the interengaging portion of the coupling member comprises a resilient detent.

11. A drive assembly according to claim 10 wherein the resilient detent comprises a ball received in a recess in the coupling member and a biasing means which bears on the ball to bias it to an outwardly extending position at which it will bear on the shaft.

12. A drive assembly according to claim 5 wherein the actuating means comprises a handle operably connected to the coupling member.

13. A drive assembly according to claim 12 wherein the handle is operably connected to the coupling member via an intermediate member between the handle and the coupling member.

14. A drive assembly as claimed at claim 7 wherein the portion associated with the drive member is formed with a surface which is complementary to the convoluted outer circumferential surface.

15. drive assembly as claimed at claim 1 wherein the resiliently flexible non-metallic material comprises a stress absorbing rubber.

16. A coupling adapted for the static engagement and disengagement of a drive means from a driven member, the coupling comprising a driven member associated portion in the form of a stress absorbent coupling member, a shaft operably connected to the driven member, a coupling member and an actuating member, the coupling member being slidably mounted on the shaft such that on operation of the actuating member, the coupling member is caused to slide along the shaft between a first position at which the driven member is disengaged from the drive means and a second position at which the driven member engages the drive means; wherein the actuating means includes a handle operably connected to the coupling member via an intermediate member having a recess in its radial surface; and wherein the intermediate member is connected to the handle via a contact member disposed at least partially within the recess; wherein the contact member is positively locatable within the recess and without contacting the edges of the recess, with the positive location of the contact member being effected by positioning the handle in a predetermined fashion; and wherein the handle has a shroud and is releasably positioned by compatible bores in the handle and shroud.

\* \* \* \* \*